(No Model.)
F. E. WOODIN.
CHART FOR TEACHING AND PRODUCING FACIAL EXPRESSIONS.
No. 331,268. Patented Nov. 24, 1885.
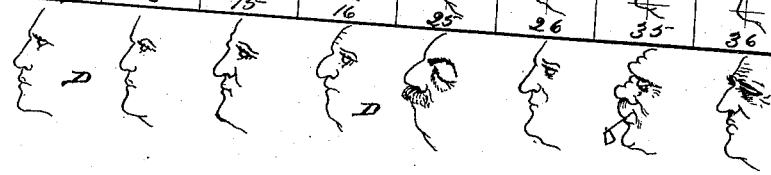
WITNESSES:
Frank E. Woodin,
INVENTOR.
by Louis Bagger & Co.
ATTORNEYS.

UNITED STATES PATENT OFFICE.

FRANK E. WOODIN, OF EVART, MICHIGAN.

CHART FOR TEACHING AND PRODUCING FACIAL EXPRESSIONS.

SPECIFICATION forming part of Letters Patent No. 331,268, dated November 24, 1885.

Application filed February 26, 1885. Serial No. 157,130. (No model.)

*To all whom it may concern:*

Be it known that I, FRANK E. WOODIN, a citizen of the United States, and a resident of Evart, in the county of Osceola and State of Michigan, have invented certain new and useful Improvements in Charts for Teaching and Producing Facial Expressions, &c.; and I do hereby declare that the following is a full, clear, and exact description of the invention, which will enable others skilled in the art to which it appertains to make and use the same, reference being had to the accompanying drawings, which form a part of this specification, and in which—

Figure 1 is a view illustrating a specimen of my improved chart, and Fig. 2 is an example illustrating the use of the same.

The same letters refer to the same parts in both the figures.

This invention relates to a chart for teaching and for assisting in producing illustrations of facial expressions, the said chart having for its object to assist in educating the eye and hand of pupils studying the art of drawing; and the invention consists in a chart comprising a series of columns, each of which is subdivided into a series of spaces, in which separate features of the face are drawn in regular order, and by properly combining which a great variety of countenances may be produced, the expression of all of which shall be distinctly different, as will be hereinafter fully described, and particularly pointed out in the claim.

In the drawings hereto annexed, A designates the chart, which is in this case divided into a series of five columns, B B, which are subdivided by horizontal lines into series of five spaces, C C, which are numbered, as shown, from one to twenty-five, the numbers running in any suitable manner which I may deem it convenient to adopt. The five spaces of each of the vertical columns are appropriated to the five expressive members or features of the human face—viz., the forehead, eye, nose, mouth, and chin, which are arranged in consecutive order from top to bottom. By combining the five features of each column the complete outline of a human face is produced, which is illustrated at the bottom of each column, as shown at D. For facilitating the reproduction of the features by the pupil each of the spaces C is provided with vertical and horizontal center lines. It will be seen that by interchanging the features from the several columns and arranging them in proper consecutive order a great variety of expressions may be produced, which are totally different from each other, and from the five model outlines D.

The method of using my improved chart and its advantages will be readily understood from the foregoing description, taken in connection with the drawings hereto annexed. Given a selection of five features from any of the columns of the chart, they may be combined to form the outline of an expressive face, and the eye and hand of the pupil will be trained not only to copy correctly, but to observe the details of difference in expression of the several individual features, and eventually to originate with a facility which is not otherwise readily attainable by mechanical means of instruction. This system of instruction applies not alone to the human face, but may be adapted as well to animals, &c; nor is it confined to pencil-drawing, but applies equally well to penmanship, pastel-work, painting, and other art work.

Having thus described my invention, I claim and desire to secure by Letters Patent of the United States—

A chart for teaching and assisting in producing illustrations of facial expressions and the like, comprising a series of columns subdivided horizontally into spaces, the spaces of each column containing leading features arranged in consecutive order, so that by combining a series of the features selected from any of the columns a complete outline shall be produced, substantially as and for the purpose set forth.

In testimony that I claim the foregoing as my own I have hereunto affixed my signature in presence of two witnesses.

FRANK E. WOODIN.

Witnesses:
  FRED POSTAL,
  MARTIN L. STEVENS.